(Model.)

4 Sheets—Sheet 1.

E. C. TERRY.
PISTON WATER METER.

No. 344,064.　　　　　　　　Patented June 22, 1886.

Witnesses.
John Edwards Jr.
John A. Lewis.

Inventor.
Edward C. Terry.
By James Shepard Atty.

(Model.)

E. C. TERRY.
PISTON WATER METER.

No. 344,064. Patented June 22, 1886.

Witnesses:
John Edwards Jr.
John A. Lewis.

Inventor:
Edward C. Terry.
By James Shepard
Atty.

(Model.)

4 Sheets—Sheet 3.

E. C. TERRY.
PISTON WATER METER.

No. 344,064. Patented June 22, 1886.

Witnesses:
John Edwards Jr.
John A. Lewis

Inventor.
Edward C. Terry.
By James Shepard
Atty.

(Model.)

4 Sheets—Sheet 4.

E. C. TERRY.
PISTON WATER METER.

No. 344,064.  Patented June 22, 1886.

Witnesses:
John Edwards Jr.
John A. Lewis

Inventor.
Edward C. Terry.
By James Shepard
Atty.

UNITED STATES PATENT OFFICE.

EDWARD C. TERRY, OF HARTFORD, CONNECTICUT.

PISTON WATER-METER.

SPECIFICATION forming part of Letters Patent No. 344,064, dated June 22, 1886.

Application filed June 10, 1885. Serial No. 168,288. (Model.)

*To all whom it may concern:*

Be it known that I, EDWARD C. TERRY, a citizen of the United States, residing in the city and county of Hartford, and State of Connecticut, have invented certain new and useful Improvements in Water-Meters, which improvements are fully set forth and described in the following specification, reference being had to the accompanying four sheets of drawings.

This invention relates to that class of automatic devices for measuring liquids known as "piston-meters," my immediate object being to so improve said meters that they will measure and register more accurately than heretofore under different pressures and under varying conditions.

Figure 1:
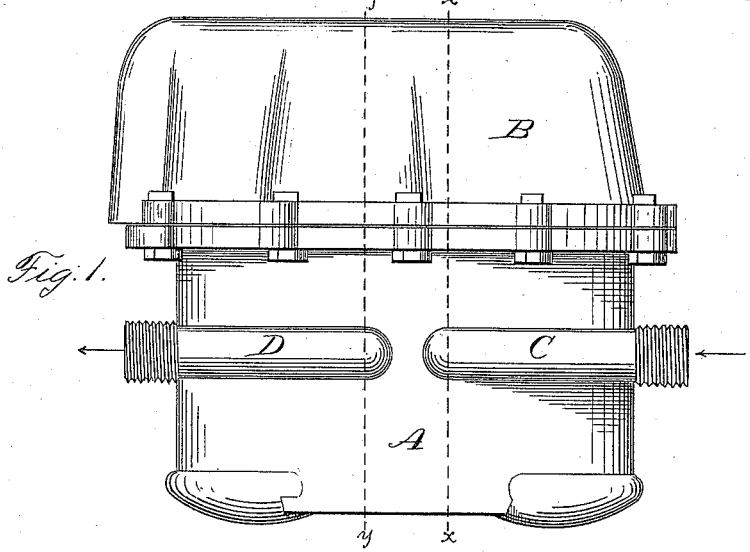
Figure 2:
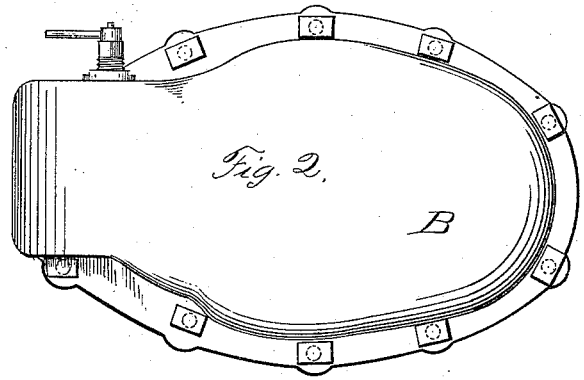
Figure 3:
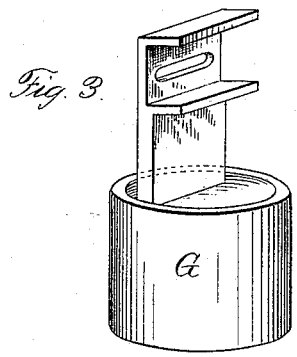
Figure 4:
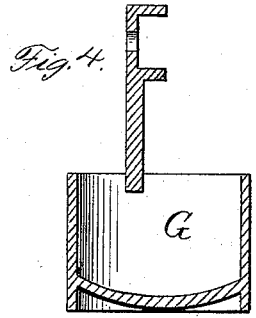
Figure 5:
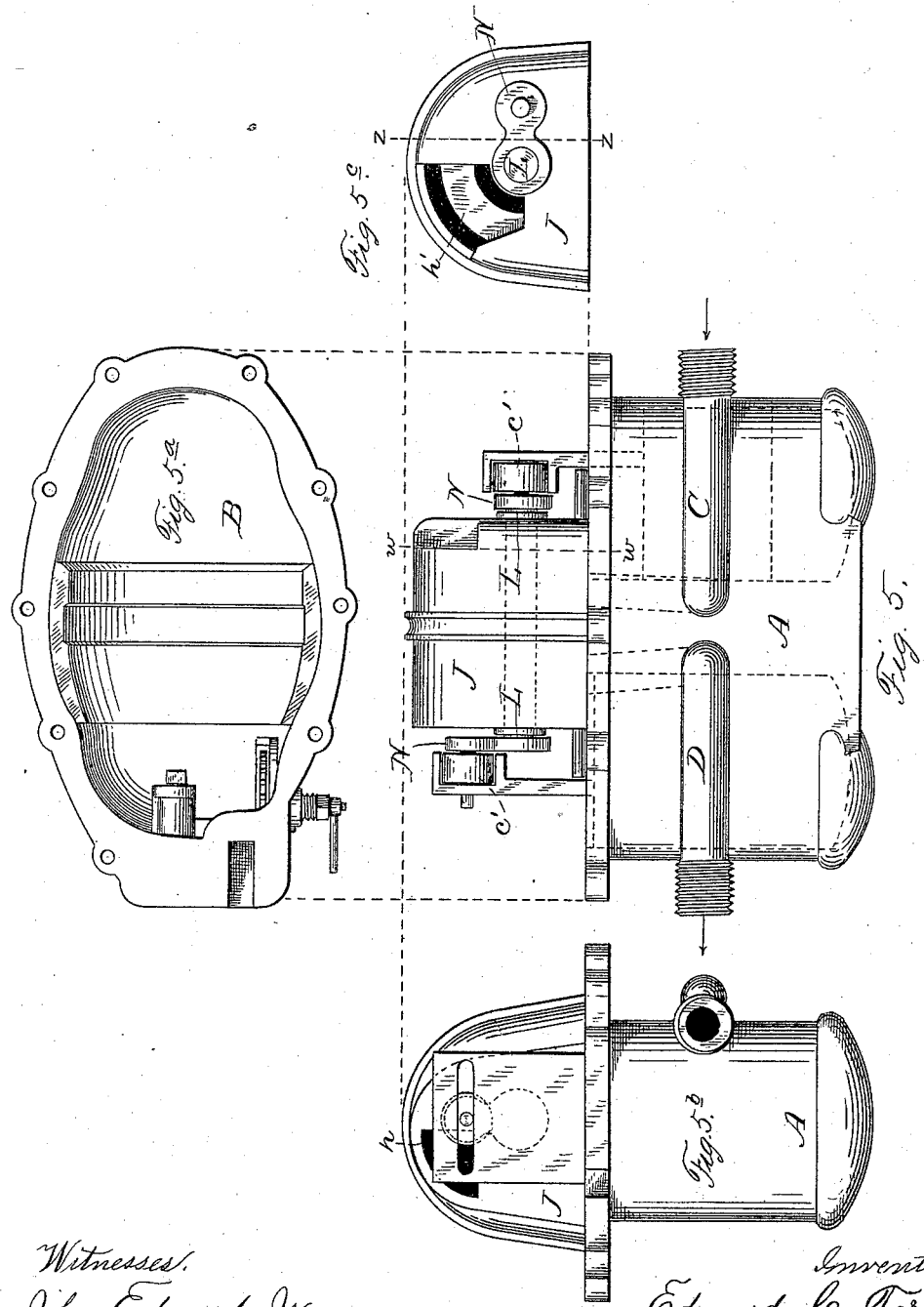
Figure 6:
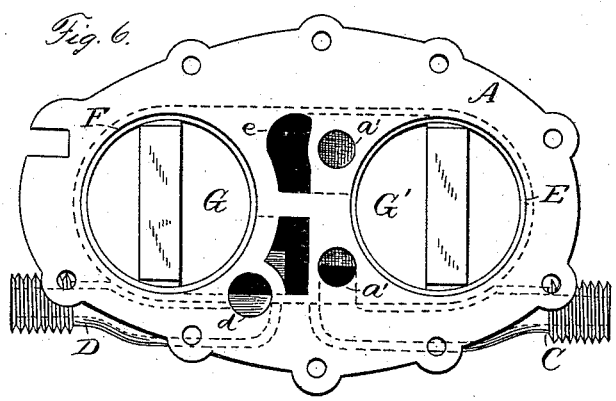
Figure 7:
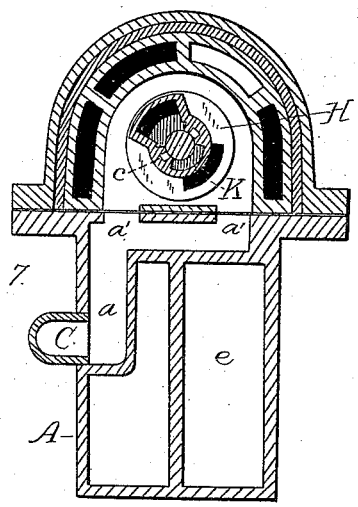
Figure 8:
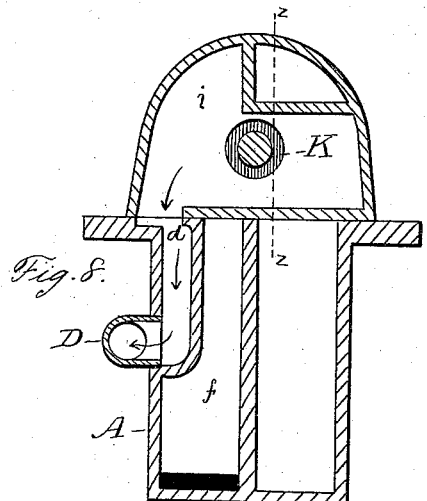
Figure 9:
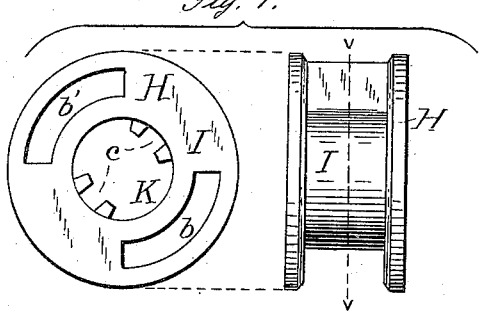
Figure 10:
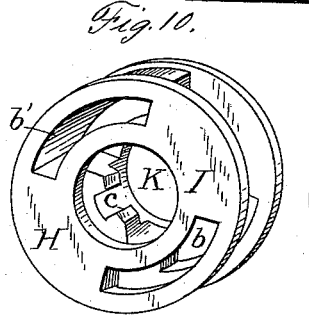
Figure 11:
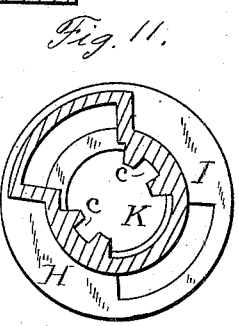
Figure 12:
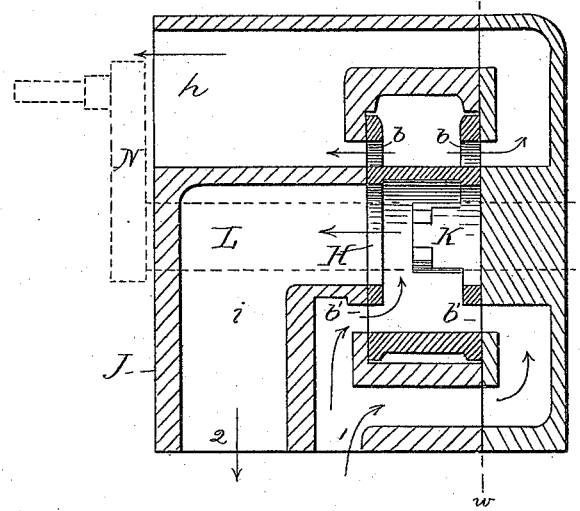

In the drawings hereunto annexed, Figure 1 is a side elevation of a complete meter, and Fig. 2 a top view of the same. Fig. 3 is a perspective view of one of the pistons which I use, and Fig. 4 is a vertical sectional view through the center of said piston. In Sheet 2 of the drawings I have shown at Fig. 5 a side elevation of my improved meter with its cap or upper shell removed, the same being shown as if tipped backward in Fig. 5$^a$ to expose its inner side. Fig. 5$^b$ is an elevation from the left-hand end of Fig. 5, and Fig. 5$^c$ is a view of the right-hand end of the valve-box. Fig. 6 is a top or plan view of the lower half of the meter-case, with the valve-box removed, and shows the cylinders with pistons in place. Fig. 7 is a vertical cross-section on line $x$ $x$ of Fig. 1, showing the inlet-pipe and the chambers which lead from it to the valve. Fig. 8 is a similar view on line $y$ $y$ of Fig. 1, with cap B removed, showing the discharge chamber and pipe. In Fig. 9 I have shown (detached and somewhat enlarged) end and edgewise views of my new form of rotary valve; also, in Fig. 10 a perspective view of the same, and in Fig. 11 a cross section on line $v$ $v$ of Fig. 9. Fig. 12 is a longitudinal section of the valve-box, taken on line $z$ $z$ of Figs. 5$^c$ and 8, the same being enlarged to nearly full size. Figs. 13, 14, 15, and 16 show the several positions assumed by valve H as it rotates, each of said figures, as well as those before referred to, being explained hereinafter.

For convenience in fitting, assembling, inspecting, and repairing my improved meter, I form the case in two companion parts, A and B, the same being preferably of cast metal, and when in use bolted securely together with an intervening packing of rubber or similar material. The lower section, A, is provided with cylindrical chambers E F, in which are located bucket-pistons G G'. (See Fig. 6.)

Secured to case A, or formed as integral parts of said case, are the inlet-pipe C and discharge D. The inlet-pipe C leads into a chamber in case A, from which chamber the water passes immediately upward through openings $a$ $a'$ (see also Fig. 6) into a corresponding chamber in the valve-box J, completely encircling the rotary valve H. (See Fig. 7.) The valve H is formed with flanged sides, each of said sides having ports $b$ $b'$, the former connecting with the peripheral groove of said valve, and forming exits for the inflowing water, the latter ports, $b'$, connecting with the axial opening K, to provide a passage for the outflowing water. The crank-shaft L is considerably smaller than the opening K, and is provided with splines, which enter corresponding seats, $c$ $c$, in the valve H, thus leaving an annular space around the greater portion of the shaft. Said shaft L carries at each end a crank, N, having a roll, $c'$, which engages suitable ways in the piston-plate, as will be readily understood by reference to Fig. 5 and its several projections. These cranks N are so located relative to each other that there are no dead-centers to overcome when in use.

Having thus described in general terms the construction of the meter-case, valve, inlet and outlet pipes, and crank-shaft, I will now proceed to describe the valve-box, its several ports and chambers, and the action and course of the water as it passes through said meter. The valve-box J rests on the upper face of case A, and is held in a desired position by dowel-pins or similar means, so that the several openings in its under side shall register accurately with the openings in said case A—that is to say, the opening which leads into the discharge-chamber $i$ is immediately over opening $d$, and the openings which lead to the valve-chamber are immediately over openings

*a a'*. In addition to the inlet and discharge openings there are in the upper face of case A openings *e f*, (see Fig. 6,) the former of which leads into a passage connecting with the lower end of cylinder E, and the latter into a passage which connects with the corresponding end of cylinder F.

At each end of valve-box J is an aperture, *h h'*, connecting with ports which supply water to the upper end of the cylinders.

In order to distribute the current of water to the proper cylinder end, and at precisely the proper instant, I have provided (by coring the valve-box J) a peculiar system of ports and chambers, and these ports and chambers are so arranged relative to the ports of the rotary valve H that the inflowing water, after it reaches the peripheral groove of the valve, passes outward in opposite directions through ports *b*; yet the two streams unite at the proper time and pass to the desired cylinder end as a single stream. My object in thus dividing the current of water and causing it to pass out at opposite sides of the valve is to furnish a practically balanced valve, thereby overcoming all friction and consequent wear.

I have found in practice that a constant pressure of water against one side of the valve, even if said pressure be very slight, acts to force the valve inward against its seat, thereby producing a degree of friction which soon causes said valve to leak badly and prevents it from measuring accurately the current of water passing through it. With the balanced valve which I provide no appreciable wear can occur.

Referring to Fig. 12, which shows valve H in position to allow the inflowing water to pass to the upper end of cylinder F, the principle and action of my balanced valve will be more readily seen, the arrows in the upper chamber indicating the course of the entering water as about to pass to the upper end of cylinder F, and those at the lower portion indicating the course of the water which, having passed through the meter, is about to be discharged. Arrow I indicates the water as passing upward from opening *f*—that is, from the lower end of cylinder F. The water then separates and enters the valve-ports *b' b'*, passes through the enlarged central hole into chamber *i*, from which it passes downward into opening *d*, (see arrow 2,) and thence goes to the discharge-pipe D.

The valve-box J is formed of two parts, which separate at line *w w*, (of Figs. 5 and 12,) the inner wall of the smaller or removable section being face-milled to form a seat for the outer face of valve H.

Figure 13:
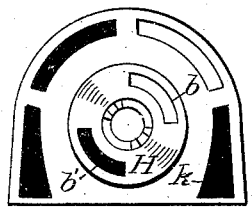

In Fig. 13, which is an end view of the principal section of the valve-box with valve in place, said valve is shown with its ports in the same position indicated by the sectional Fig. 12, in which position, it will be remembered, the water is passing to the upper end of cylinder F, and also returning from the lower end of said cylinder.

Figure 14:
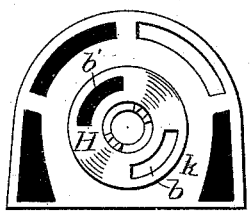
Figure 15:
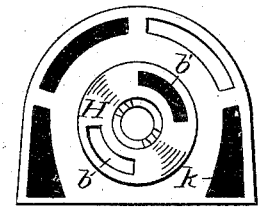

In Fig. 14 valve H is shown as having passed one-quarter turn to the right hand, in which position ports *b* connect with a corresponding port, *k*, which in turn connects with opening *e*, to furnish water to the lower end of cylinder E. Ports *b'* meanwhile receive the water which is being forced out of the upper end of said cylinder E and discharge the same through the axial hole into chamber *i*, and thence through pipe D. In the next position assumed by valve H, Fig. 15, ports *b'* connect with the upper end of cylinder F to discharge the water contained therein, and the opposite ports, *b*, furnish inflowing water to the lower end of said cylinder F.

Figure 16:
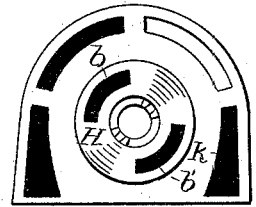

In Fig. 16 valve H is shown in position to receive and discharge water from the lower end of cylinder E and to conduct the stream to the upper end of said cylinder. The several ports and conducting-chambers for the inflowing water in the valve-box are in principle and action identical with those shown in Fig. 12 and described heretofore in detail; but it should be understood that ports *b' b'* connect at all times and in all positions with the enlarged axial hole leading into the discharge-chamber, so that the stream of outflowing water passes freely through said ports and chamber with no cut-off or obstruction.

It will be obvious that the joint between the valve-box and cap B should be practically water-tight, and to provide such a joint in a simple and comparatively cheap manner I have formed the inner surface of said cap with a groove, which, if the several parts were assembled, would extend entirely around the upper or exposed surface of the valve-box. Now, having turned said cap hollow side uppermost, I place the valve-box in position in said cap, and pour in Babbitt metal or other suitable lining material.

I am aware that there are other methods by which a fairly satisfactory result could be attained—as, for instance, by interposing a packing of rubber between the confronting parts; but I prefer the metallic lining described, as it is cheaply produced, and needs no subsequent replacing or repairs.

In order to impart motion to a suitable counting or registering device, I have extended somewhat the crank-pin at one end of shaft L, and to this pin a pitman or connecting rod may be attached, whose other end connects with any suitable registering mechanism; but as my invention does not lie in said registering mechanism I have thought it unnecessary to show detailed drawings of the same.

I am aware that prior patents show meters having water-passages leading to each cylinder end and a valve with outlet-ports arranged on opposite sides of the valve and inlet-ports arranged in like manner, but so combined that the water can flow through only one of these opposite inlet or outlet ports at a time to or from the same cylinder end. It is evident that such a combination cannot balance the valve, and it is hereby disclaimed.

Having thus described my invention, I claim—

1. A valve (for meters of the class herein referred to) having a peripheral groove adapted to receive the inflowing water, outlet-ports at each side of said groove to distribute said inflowing water equally to the proper cylinder, and ports leading inward from opposite sides of said valve and connecting with the axial discharge-hole, all substantially as described, and for the purpose specified.

2. In combination with a meter-case having water-passages leading to each cylinder end, a valve having ports leading outwardly from opposite sides, both of which ports are simultaneously brought into communication, first with one of said passages and then with the other, substantially as described, and for the purpose specified.

3. In combination with a meter-case having water-passages leading to each cylinder end, a valve having ports leading inwardly from opposite sides, both of which ports are simultaneously brought into communication, first with one of said passages and then with the other, substantially as described, and for the purpose specified.

4. In a water-meter, the combination of the crank-shaft, the rotary valve mounted thereon, and a valve-chamber having water-passages upon opposite sides leading from a common passage to the valve, or vice versa, the same being arranged for the simultaneous flow of water through each of said side passages, substantially as described, and for the purpose specified.

5. In combination with a shaft splined as described, a valve having an enlarged axial hole with seats or recesses adapted to engage said splines, as and for the purpose specified.

6. In combination with a crank-shaft splined as described, a valve having an enlarged axial hole with seats or recesses adapted to engage said splines, said valve having also ports leading inward from the two opposite sides and connecting directly with the central discharge-opening, all being substantially as herein described, and for the object specified.

7. The combination of the case A, having cylinders E F, the valve-chamber J, having valve and crank-shaft fitted thereto, the pistons connected therewith, and the cap or upper case, B, fitted over said valve-chamber, with an intermediate packing, substantially as described, and for the purpose specified.

EDWARD C. TERRY.

Witnesses:
JAMES SHEPARD,
JOHN EDWARDS, Jr.